(12) United States Patent
Freeman et al.

(10) Patent No.: US 11,045,702 B1
(45) Date of Patent: Jun. 29, 2021

(54) INTEGRATED GOLF CLUB SUPPORT

(71) Applicants: Hayes Freeman, Marietta, GA (US); Daniel Poston, Plainfield, IL (US)

(72) Inventors: Hayes Freeman, Marietta, GA (US); Daniel Poston, Plainfield, IL (US)

(73) Assignee: HD Products, Inc., Plainfield, IL (US)

( * ) Notice: Subject to any disclaimer, the term of this patent is extended or adjusted under 35 U.S.C. 154(b) by 0 days.

(21) Appl. No.: 17/131,932

(22) Filed: Dec. 23, 2020

(51) Int. Cl.
| | |
|---|---|
| *A63B 55/10* | (2006.01) |
| *A63B 53/14* | (2015.01) |
| *A63B 57/20* | (2015.01) |
| *F16M 13/00* | (2006.01) |
| *A63B 57/30* | (2015.01) |
| *A63B 57/35* | (2015.01) |

(52) U.S. Cl.
CPC ............. *A63B 55/10* (2013.01); *A63B 53/14* (2013.01); *A63B 57/207* (2015.10); *A63B 57/353* (2015.10); *F16M 13/005* (2013.01); *A63B 57/35* (2015.10); *A63B 2209/08* (2013.01)

(58) Field of Classification Search
CPC ..... A63B 55/10; A63B 57/353; A63B 57/207; A63B 53/14; A63B 57/35; A63B 2209/08; F16M 13/005
See application file for complete search history.

(56) References Cited

U.S. PATENT DOCUMENTS

| | | | |
|---|---|---|---|
| 3,667,078 A | 6/1972 | Distasio | |
| 4,805,911 A * | 2/1989 | Ferlazzo | A63B 55/10 473/282 |
| 4,991,839 A | 2/1991 | Lumbattis | |
| 5,076,581 A | 12/1991 | Boberg | |
| 5,127,530 A | 7/1992 | Ortuno | |
| 5,171,015 A | 12/1992 | Vale | |
| 5,285,990 A | 2/1994 | Engel | |
| 5,377,977 A * | 1/1995 | MacNeary | A01B 1/24 473/286 |
| 5,492,230 A | 2/1996 | Horton | |
| 5,759,120 A | 6/1998 | Mathis | |
| 5,782,704 A | 7/1998 | Tetler | |
| 5,813,414 A | 9/1998 | Zutler | |
| 5,890,970 A | 4/1999 | Donati | |
| 6,159,107 A * | 12/2000 | Walton | A63B 60/42 473/282 |
| 6,260,717 B1 | 7/2001 | Keller | |
| 6,390,931 B1 | 5/2002 | Berndt | |
| 6,482,103 B1 * | 11/2002 | Vache | A63B 55/10 473/282 |
| 6,572,487 B1 | 6/2003 | Ruff | |
| 6,578,719 B1 | 6/2003 | Finn | |
| 7,235,022 B2 | 6/2007 | Frayne | |
| 7,452,284 B2 | 11/2008 | Pepe | |
| 7,658,682 B2 * | 2/2010 | Hoium | A63B 53/007 473/285 |
| 7,771,287 B2 | 8/2010 | Staszak | |
| 7,828,670 B1 * | 11/2010 | Schroader | A63B 57/207 473/285 |

(Continued)

*Primary Examiner* — Stephen L Blau

(57) ABSTRACT

The present invention is directed to an integrated golf club support installed at the top of a golf club grip, distal from the club head. When the club is laid on the ground in the prone position, the support elevates the shaft of the club to prevent undesirable contact between the playing surface or ground and the golf club grip.

15 Claims, 6 Drawing Sheets

(56) References Cited

U.S. PATENT DOCUMENTS

| | | | |
|---|---|---|---|
| 8,231,479 B1 * | 7/2012 | McIntosh | A63B 69/3685 |
| | | | 473/226 |
| 8,414,415 B1 * | 4/2013 | Twohig | A63B 55/10 |
| | | | 473/282 |
| 8,496,536 B1 * | 7/2013 | McIntosh | A63B 60/52 |
| | | | 473/226 |
| 2005/0233823 A1 | 11/2005 | Klein | |
| 2014/0135142 A1 | 5/2014 | Wilson | |
| 2016/0074722 A1 | 3/2016 | Rogers | |
| 2019/0275392 A1 | 9/2019 | Soboleski | |

* cited by examiner

INTEGRATED GOLF CLUB SUPPORT

FIELD OF THE INVENTION

The present invention is directed to an integrated golf club support installed at the top of a golf club grip, distal from the club head. When the club is laid on the ground in the prone position, the support elevates the shaft of the club to prevent undesirable contact between the playing surface or ground and the golf club grip.

BACKGROUND OF THE INVENTION

The sport of golf is played on a course consisting of multiple holes, each hole having a teeing area, fairway, and a putting green. At each hole, the player strikes their ball with a golf club from the teeing area, continuously striking the ball using clubs of varying types (drivers, woods, irons, putters, and the like), until the ball is ultimately holed on the putting green. The clubs are stored in the player's golf bag when not in use during play, requiring the player to frequently retrieve and return clubs to their bag.

Rules governing the sport of golf require players to avoid unreasonable delays of game. (See, Player's Edition of the Rules of Golf, 2019 ed., Rule 5.6). Likewise, many course owners having rules prohibiting players from carrying and placing bags on certain areas of the course, such on putting greens. Therefore, it is typical (both to ensure compliance with the Rules and as a matter of etiquette) for players to carry a few clubs on their person, leaving the remaining clubs in their bag off the field of play. Otherwise, a player would need to return to their bag to return and retrieve clubs after each stroke, causing an unreasonable delay of game, for which the Rules will penalize the player by adding strokes to their final score.

For those clubs carried on a player's person, unselected clubs are usually laid down on the ground or playing area, which can cause the club to become soiled by water, dirt, sand, and the like. A soiled grip can negatively impact a player's swing and performance.

Therefore, there is a constant need for golf players who carry multiple clubs on their person to have the ability to lay unused clubs on the playing area, without the club grip from becoming soiled.

Stands or supports which elevate clubs (particularly the grip) above the surface of the course are known in the art. Known stands largely fall into one of three categories: (1) golf club stands not attached to the golf club; (2) detachable stands which are removed during use of the club; and (3) golf club stands attached to the club, and not detached during play.

For example, U.S. Publication No. 2014/0353440 to Campos is an example of a stand falling into the first category. Campos describes a gulf club stand constructed from a rod having a distal end which is inserted into the ground, and a pitched loop onto which a golf club shaft is rested when not in use (See, FIG. 1B of Campos).

Stands described in this category have several disadvantages. First, the stands must be stored in the golf bag separately from the clubs. Various parts of the stand may catch and damage interior features of a golf bag when storing or retrieving the stand.

Second, the stand must be retrieved, installed, and then uninstalled and stored each time the stand is used. Play time is increased and use of the stand may not be feasible if the area of play is not conveniently close to the player's golf bag when the stand is needed. Inserting the stand into the ground may be physically difficult for some players.

Finally, because these stands are not attached to the club, when used on uneven ground or during inclement weather, the club may slip or fall when rested on the stand, potentially causing damage to the club. If the club falls off the stand, the grip may become wet or soiled.

U.S. Pat. No. 4,991,839 to Lumbattis falls into the second category and discloses an annular support device that can be temporarily slipped onto the handgrip of a golf club to elevate the handgrip.

When the golf club is laid on the ground in a prone position, the handgrip portion of the club will be elevated a slight distance above the ground. The annular support device is removed from the golf club before use in play.

In addition to the disadvantages noted above, these category two-type stands are constantly being installed and removed, making them prone to causing damage to the club over time, require an extra step of installing/removing these types of stands, and require additional storage area within player's golf bag. These stands tend to have a shorter life span as well.

U.S. Pat. No. 6,159,107 to Walton is an example of a category three stand and includes a support installed into the vent hole of a golf club grip. The support includes a hinged inner tube having a hinged portion, both disposed in an outer tube. The tubes are recessed into the club shaft. In operation, the inner tube is pulled out from the end of the grip and pivots to form a support.

Many of the disadvantages noted for the first and second category stands are also applicable to the category three stands. For example, the stand described in Walton may catch and damage internal features of the bag or the club grip when the club is inserted or removed from the bag.

Because these category three stands largely rely upon the resiliency of the grip material to securely mount the stand to the club, as the grip become distended, ripped, or lose its elasticity, the stands may become loose or detached from the club.

Further, these types of stands may move or rattle against the inside wall of the shaft during play, interfering with the player's club swing. Because of the complexity and installation location, these stands may impact the balance of the club, negatively affecting a player's swing.

Category three stands are generally are susceptible to malfunction if sand or other debris material become trapped between the moving parts of the stand.

Finally, these stands are typically not biased in the open and closed positions, making them: (1) prone to collapsing from their standing position, causing the club grip to fall onto the course surface, and (2) more likely to damage the interior features of a golf bag when retrieved or returned to the bag.

Accordingly, there is a current need for an integrated golf club stand or support that avoids one or more of the disadvantages noted above.

SUMMARY OF THE INVENTION

The present invention is directed to an integrated golf club support having a mounting anchor, a base with base bottom surface, and a lid. The base and mounting anchor can be separate components, or one integral body.

The mounting anchor extends from the base bottom surface, through a vent hole at the top of a golf club grip, and into the shaft of a golf club. The mounting anchor has a plurality of legs adapted to expand and frictionally engage the inside wall of the club shaft.

The base is affixed to the top surface of a golf club grip (distal from the club head). The base includes one or more base hinge knuckles extending towards the lid. The base may include a recessed region suitable for removably accepting a golf ball marker.

The lid has one or more lid knuckles configured to mate with the base hinge knuckles and be secured thereto via a hinge pin, allowing the lid to pivot about the long axis of the hinge pin. At least one lid knuckle frictionally engages a resistive base locking tongue to bias the lid from pivoting from one of three positions: open, midway, and closed.

DETAILED DESCRIPTION OF THE INVENTION

It has been found the integrated golf club stand of the present invention affords benefits over club stands known in the art. Such benefits include ease of use, decreased susceptibility to collapse when in use (particularly on uneven course surfaces), greater stability, simplified construction, ability to remain installed during play, and a decreased likelihood of catching and damaging internal features of the bag or the club grip when the club is inserted or removed from a golf club bag.

Specific embodiments and benefits are apparent from the detailed description provided herein. It should be understood, however, that the detailed description and specific examples, while indicating embodiments among those preferred, are intended for purposes of illustration only and are not intended to limit the scope of the invention.

Figure 1A:
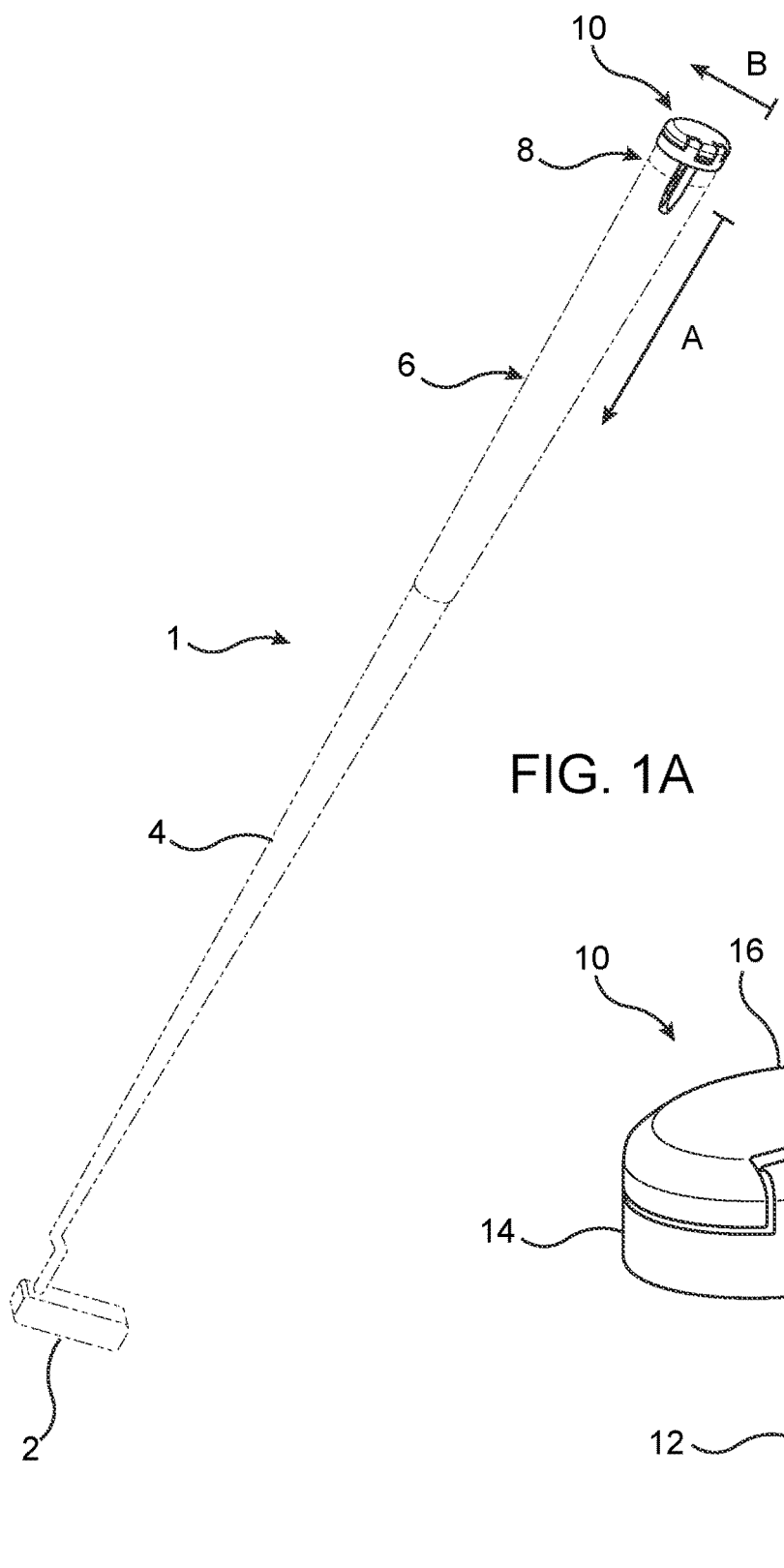
FIG. 1A is a view of a golf club and integrated support described herein.

The present invention is directed to an integrated golf club support. Referring to FIGS. 1a and 2b, illustrated is a golf club 1 having a long axis extending along line A and a short axis extending along line B. The golf club 1 includes a club head 2 and a club shaft 4. The club shaft extends from the club head to a club grip 6, substantially along the golf club long axis A.

The club grip 6 has a top short end 8 extending along the golf club short axis B, distal from the club head 2. The club shaft 4 extends into the club grip 6 substantially to the club grip top end 8.

An integrated golf club stand 10 is operably associated with the club grip top end 8. The support 10 has a mounting anchor 12, a base 14, and a lid 16 (illustrated in FIG. 1b in a closed position). The base 14 and mounting anchor 12 can be separate components affixed to each other, or one integral body.

As illustrated in FIG. 1a, the mounting anchor 12 extends longitudinally through the club grip top end 8 and into the club shaft 4.

Figure 1B:
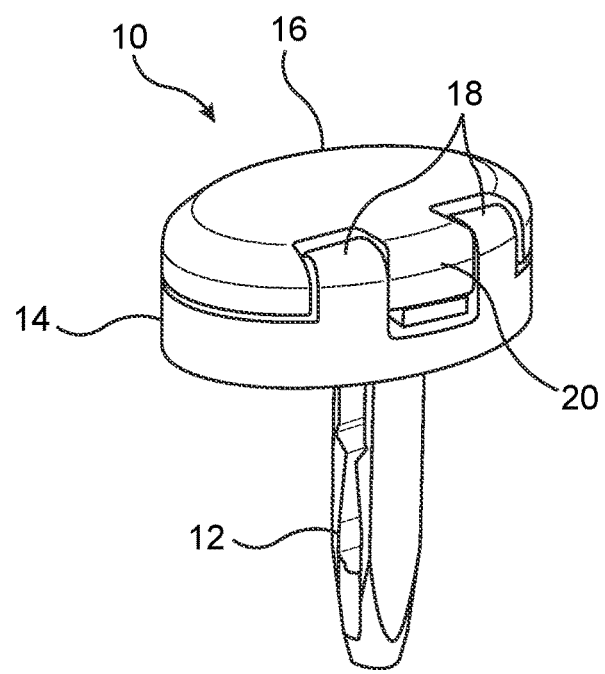
FIG. 1B is an isometric view of the support described herein, in the closed position.

Referring to FIG. 1b, the base 14 includes one or more base hinge knuckles 18 extending from the base 14 towards the lid. The lid 16 has one or more lid knuckles 20 configured to traverse, mate and be pivotably secured to the one or more base hinge knuckles 18.

The lid 16 pivots between closed, midway, and open positions. As will be discussed further below, once a position is selected, the lid 16 is biased against pivoting to another position, allowing the lid 16 to substantially remain in the selected position unless a torque of sufficient force is applied.

While the lid 16 is illustrated in the figures as having a round shape, other shapes such as an oval, square, and the like, are possible.

Figure 2:
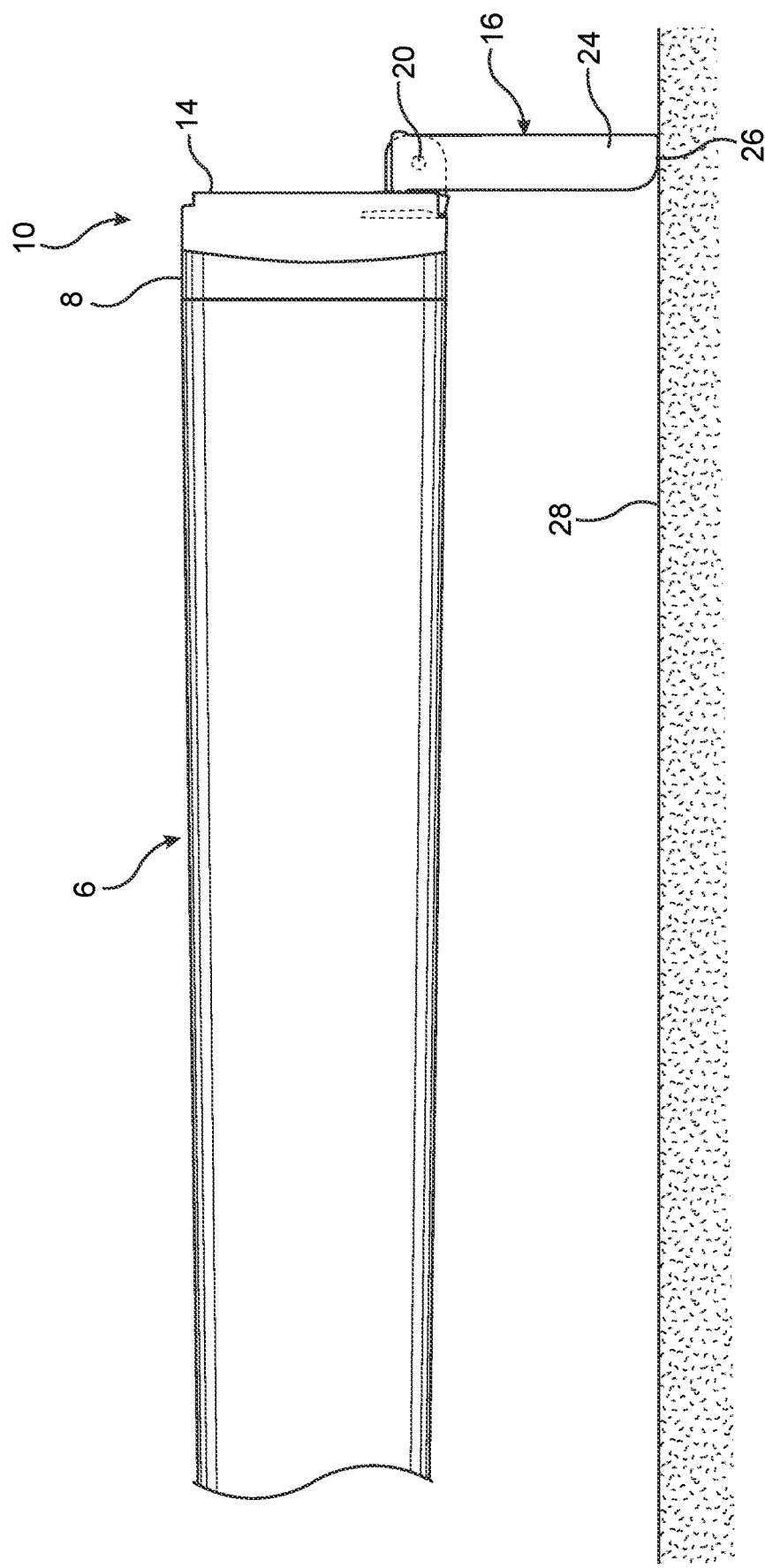
FIG. 2 is a cutaway illustration of a club grip with the support installed at the club grip top end, with the lid in the open and supporting position.

FIG. 2 is a cutaway illustration of the club grip 6 with the support 10 installed at the club grip top end 8, with the lid 16 in the open and supporting position. The lid 16 has a lid side surface 24 with a lid supporting side surface 26 distal from the lid knuckles 20.

When the lid 16 is in a fully open position, extending substantially parallel to the short axis B of the golf club 1, the lid supporting side surface 16 elevates the club grip 8 above a course playing surface 28. In this manner, foreign matter (e.g., soil, sand, water, and the like) from the course playing surface 28 is substantially prevented from contacting and adhering to the club grip 6.

Figure 3:
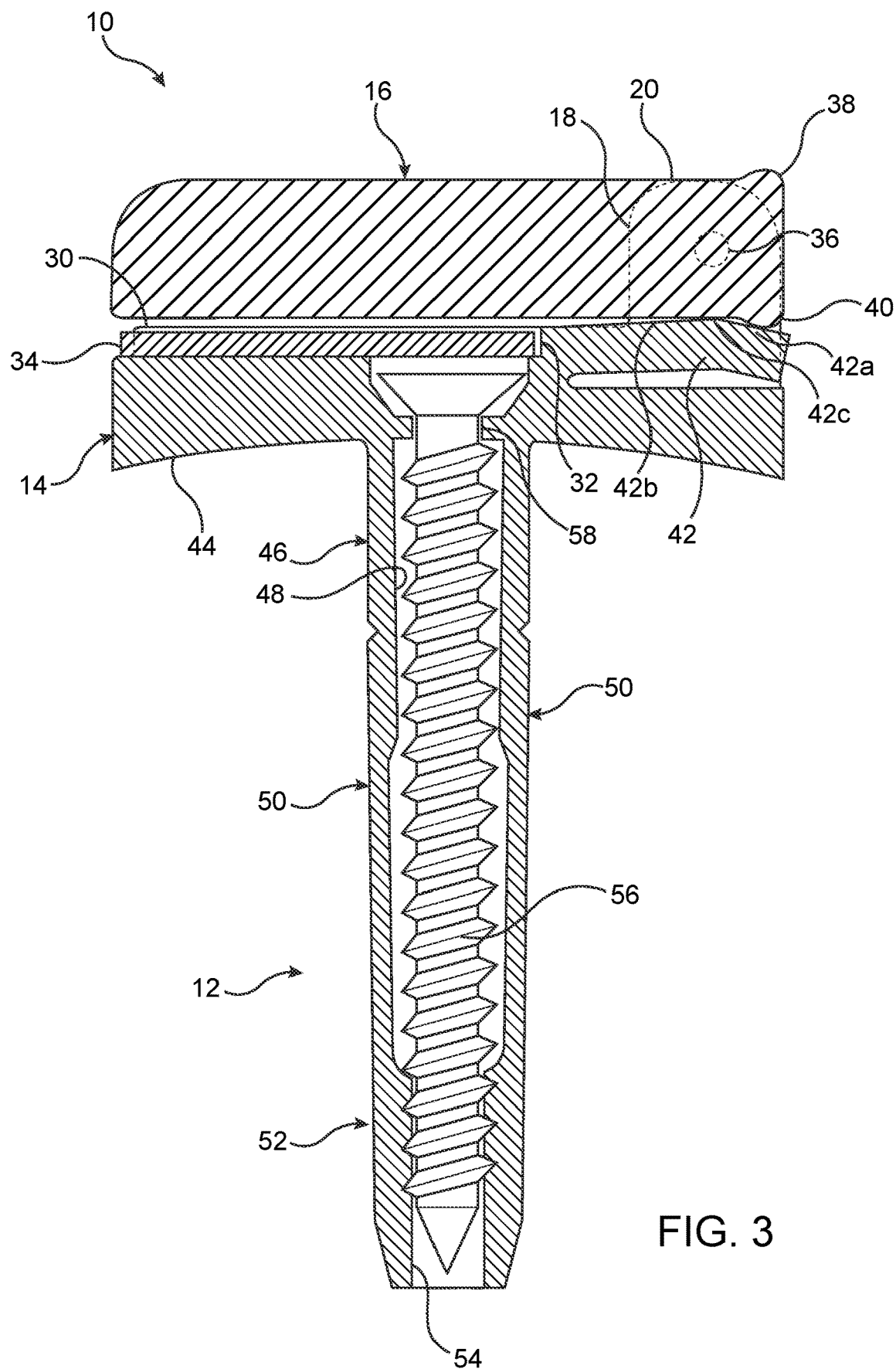
FIG. 3 is a cross-sectional diagram of the support in the closed position.

FIG. 3 is a cross-sectional diagram of the support 10 in the closed position. The base 14 optionally includes a recessed ball marker storage region extending from the base top surface 30 and defined by surface 32. The recessed ball marker storage region is provided for removably accepting a golf ball marker 34.

As those skilled in the art will understand, the diameter, construction (e.g., with or without a setting spike) and materials used in the construction of ball markers has not yet been specified by Rule (See, Player's Edition of the Rules of Golf, 2019 ed., definition for "Ball-Marker").

Although not illustrated, the recessed ball marker storage region may be configured to conform to the shape of the ball marker 34 to allow it to be frictionally retained in place when the support lid 16 is in the open, midway, and closed positions. In another embodiment, where the ball marker 34 is constructed of an appropriate material, the ball marker recess region includes a magnet for magnetically holding the ball marker 34 in position. The ball marker storage region may also be constructed to accommodate a ball maker setting spike.

As noted above, the lid 16 has one or more lid knuckles 20 configured to traverse and mate with the base hinge knuckles 18 and be pivotably secured thereto via a hinge pin 36, allowing the lid 16 to pivot about the long axis of the hinge pin 36. Only one lid knuckle 20 is illustrated in the figures.

At least one lid knuckle 20 includes upper and lower lid knuckle locking ridges 38 and 40, respectfully, for substantially maintaining the lid 16 in a selected position (open, midway, or closed). A curved, flexible base locking tongue 42 is provided having an outside end 42a, inside end 42b, and an apex 42c. The base locking tongue 42 frictionally engages the upper and lower lid knuckle locking ridges 38,40 to bias the lid 16 from pivoting from the selected position. Therefore, the lid 16 will remain in the selected position unless enough torque is applied to overcome the force applied by the base locking tongue 42.

In operation, when the lid 16 is in the closed position (as illustrated in FIG. 3), the lower lid knuckle locking ridge 40 frictionally engages the base locking tongue outside end 42a, which applies a pivot resistive force upwards towards the lower lid knuckle locking ridge 40 to bias the lid 16 from pivoting from the closed position.

As the lid 16 pivots from the closed to the midway position along angle AA (illustrated in FIG. 4), the lower lid knuckle locking ridge 40 disengages from the base locking tongue outside end 42a and slides across the base locking tongue apex 42c. When the lid 16 has pivoted a sufficient radial distance to the midway position (~90 degrees relative to the closed position), the base locking tongue 42 applies a pivot resistance force to the lid 16 to bias it from pivoting to either the open or closed positions.

When the lid 16 is pivoted to the open position (FIG. 5), the upper lid knuckle locking ridge 38 frictionally engages the base locking tongue inside edge 42b, which applies a pivot resistive force upwards towards the upper lid knuckle locking ridge 38, biasing the lid 16 from pivoting from the open position.

Figure 4:
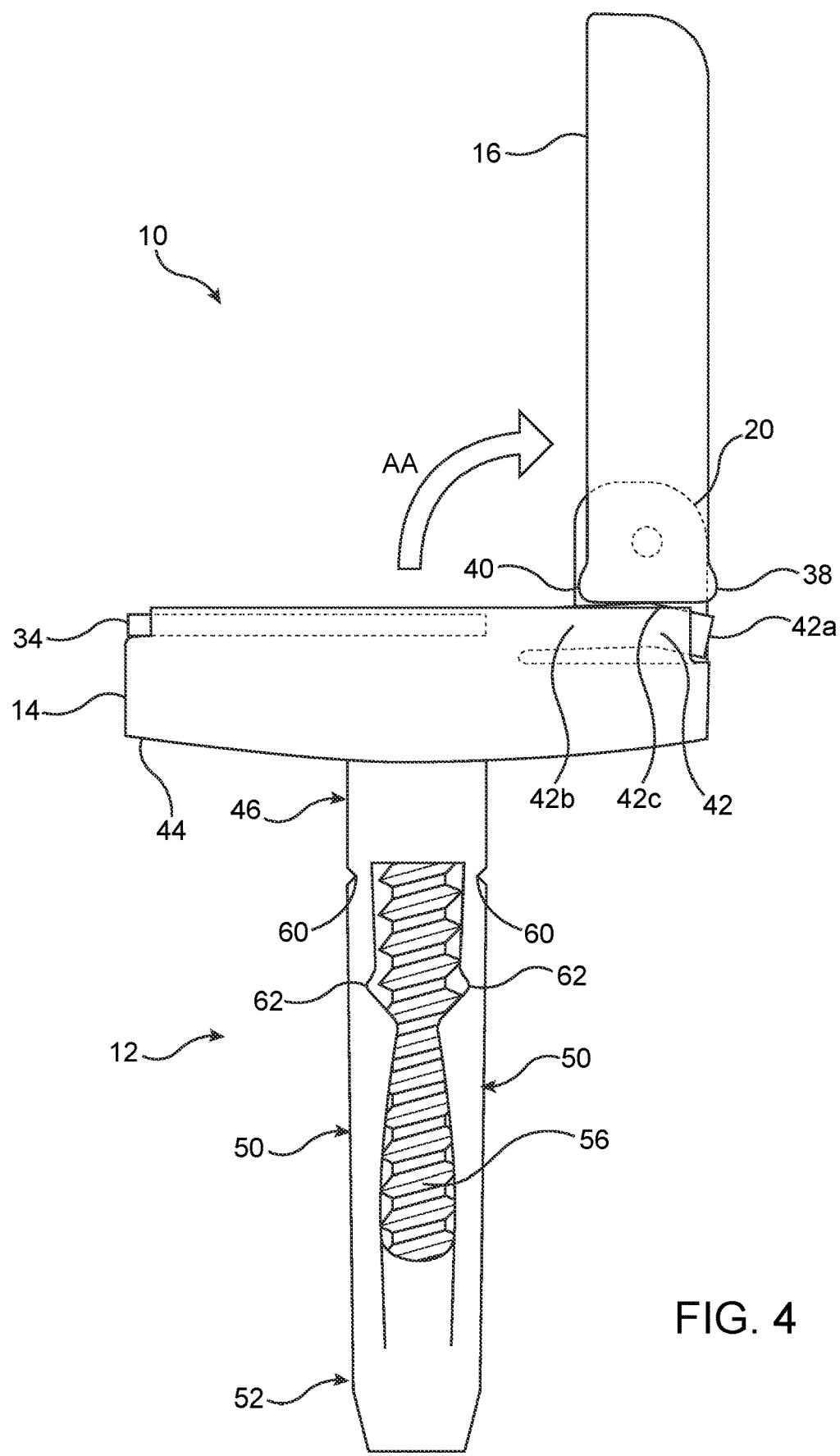
FIG. 4 is a side view of the support in the midway position.

Referring to FIGS. 3 and 4 together, the mounting anchor 12 extends perpendicularly from a base lower surface 44, parallel to the golf club long axis A. The mounting anchor 12 has an upper portion 46 having an upper portion bore defined by surface 48, a plurality of expandable legs 50, and a lower portion 52 having a lower portion bore defined by inside surface 54. The plurality of legs 50 are operably interposed between the mounting anchor upper and lower portions 46,52.

A threaded member 56 is inserted through base threaded member insertion hole defined by edge 58. The lower portion inside surface 54 may optionally be threaded to receive the threaded member 56.

Upper and lower leg expansion notches 60 and 62, respectively, allow for outward expansion of the plurality of leg members 50 during installation of the support 10.

While the Figures illustrate the threaded member 56 as being a fully threaded wood or sheet metal screw, any type of thread faster can be employed, and should have enough threading to engage the mounting anchor lower portion 52.

When the threaded member 56 threadedly engages the inside surface 54 of the lower portion 52, rotation of the threaded member causes the mounting anchor lower portion 52 to move or be pulled towards the base lower surface 44, thereby contracting the mounting anchor 12. The contraction of the mounting anchor 12 (1) causes the plurality of legs 50 to outwardly expand, and (2) causes the base lower surface 44 to be compressed against the club grip top end 8.

Figure 5:
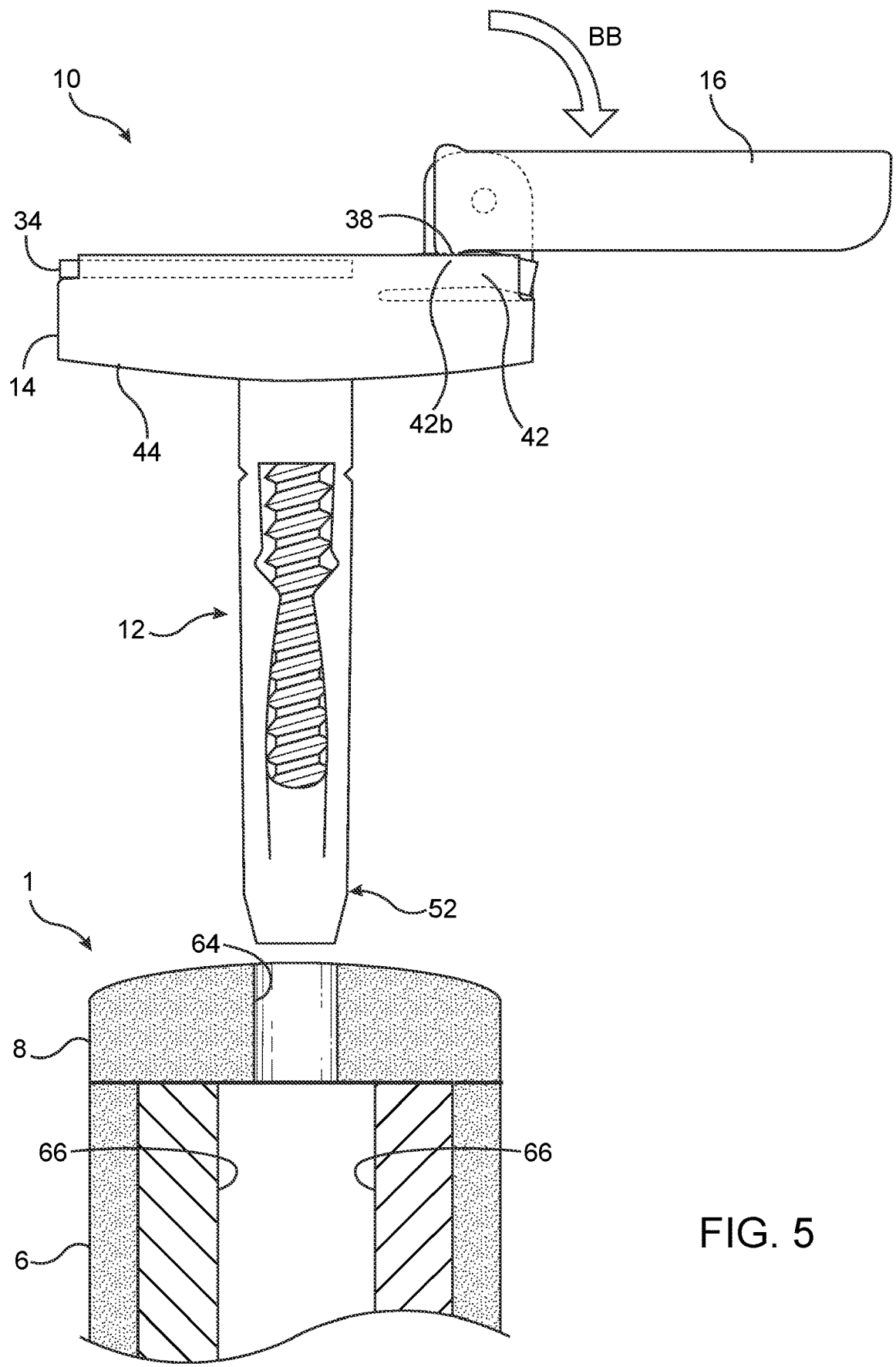
FIG. 5 is a side view of the support in the open position and the club grip top end.
Figure 6:
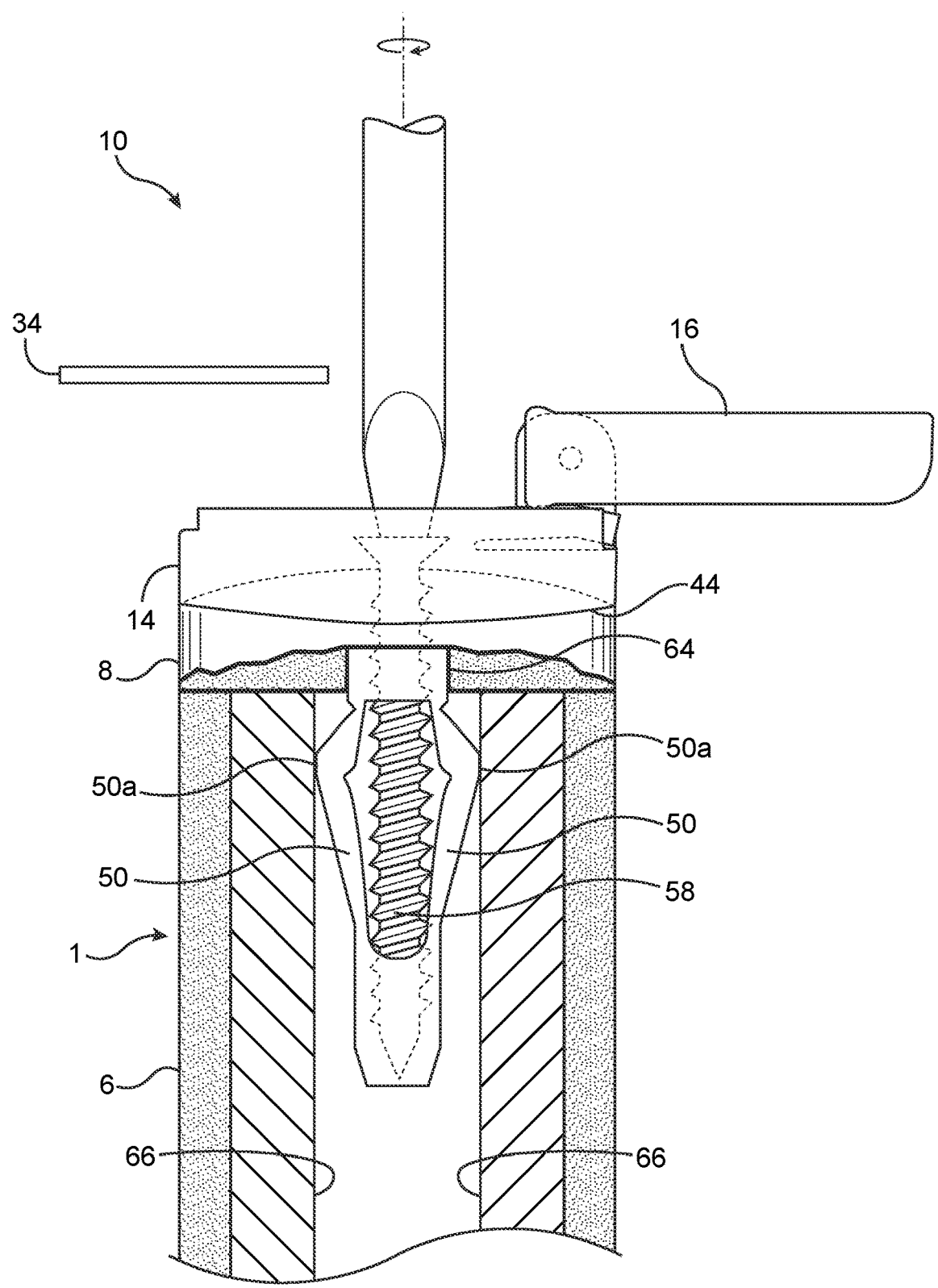
FIG. 6 is a cross-sectional diagram of the support in the open position and installed in golf club.

FIGS. 5 and 6 illustrate installation of the golf club support 10. The lid 16 is pivoted to the open position to allow user access to the threaded member 56. The mounting anchor 12 is inserted into and through a grip vent hole defined by surface 64, and into the club shaft inner bore as defined by club shaft inner surface 66.

As the threaded member 56 is rotated, the mounting anchor lower portion 52 is drawn or pulled upwards towards the club grip top end 8 causing the plurality of legs 50 to outwardly expand towards the club shaft inner surface 66.

When the golf club support is full installed, (1) at least a portion of leg outside surfaces 50a frictionally engages the club shaft inner surface 66, and (2) the base lower surface 44 is compressed against the club grip top end 8.

The installation described herein results in a stable, integrated golf club support 10 which is substantially inhibited from undesirably rotating about the golf club long axis A, which could cause the golf club 1 to fall when the golf club stand 10 is in use. Likewise, because the lid 16 is biased from pivoting from the open position, the golf club 1 is substantially prevented from collapsing onto the playing surface 28 when the club stand 10 is in use.

When the lid 16 is closed, because it is biased against moving to the open position, it remains closed during use (when the player swings) and when the golf club 1 is being placed into or retrieved from a golf bag.

The unique support anchor 12, which engages the club shaft inner surface 66, is prevented from shifting or rattling when the golf club 1 is swung by the player, which would otherwise negatively affect the player's swing.

What is claimed is:

1. A golf club support for a golf club, the golf club having a club head, a club shaft having an inner surface, and a club grip having a club grip top short end, the golf club support comprising:
    a base having a base lower surface, a mounting anchor extending from the base lower surface, and a lid pivotally connected to the base;
        the mounting anchor having a mounting anchor upper portion, a mounting anchor lower portion, and a plurality of expandable legs interposed between the mounting anchor upper portion and mounting anchor lower portion;
    the base further comprising a threaded member extending from the base lower surface and through the mounting anchor upper portion and plurality of expandable legs, threadedly engaging the mounting anchor lower portion;
    wherein when the lid is in an open position, the lid is biased from pivoting to a closed position; and
    wherein when the lid is in the closed position, the lid is biased from pivoting to the open position.

2. The golf club support of claim 1, wherein:
    the lid comprises at least one knuckle; and
    the base comprises at least one hinge knuckle;
    wherein the at least one lid knuckle is configured to mate with the at least one base hinge knuckle;
    wherein the at least one lid knuckle and the at least one base hinge knuckle are secured via a hinge pin allowing the lid to pivot about the long axis of the hinge pin.

3. The golf club support of claim 2, wherein the at least one lid knuckle comprises includes upper and lower lid knuckle locking ridges for substantially maintaining the lid in a selected position.

4. The golf club support of claim 3, wherein the base comprises a flexible base locking tongue for frictionally engaging the upper and lower lid knuckle locking ridges to bias the lid from pivoting from the selected position.

5. The golf club support of claim 4, wherein the base locking tongue has an outside end, inside end, and an apex;
    wherein when the lid is pivoted to the open position, the upper lid knuckle locking ridge frictionally engages the base locking tongue inside edge, applying a pivot resistive force upwards towards the upper lid knuckle locking ridge, biasing the lid from pivoting from the open position.

6. The golf club support of claim 1, wherein threaded engagement of the lower portion causes the mounting anchor lower portion to contract the mounting anchor, causing the plurality of legs to outwardly expand, and the base lower surface to be compressed against the club grip top short end.

7. The golf club support of claim 1, further comprising a recessed ball marker storage region configured to receive a ball marker.

8. A golf club having a support, comprising:

the golf club having a club head, a club shaft having an inner surface, and a club grip having a club grip top short end;

the golf club support comprising:

a base having a base lower surface, a mounting anchor extending from the base lower surface, and a lid pivotally connected to the base;

the mounting anchor having a mounting anchor upper portion, a mounting anchor lower portion, and a plurality of expandable legs interposed between the mounting anchor upper portion and mounting anchor lower portion;

the base further comprising a threaded member extending from the base lower surface and through the mounting anchor upper portion and plurality of expandable legs, threadedly engaging the mounting anchor lower portion;

wherein when the lid is in an open position, the lid is biased from pivoting to a closed position; and wherein when the lid is in the closed position, the lid is biased from pivoting to the open position.

9. The golf club of claim 8, wherein:

the lid comprises at least one knuckle; and the base comprises at least one hinge knuckle;

wherein the at least one lid knuckle is configured to mate with the at least one base hinge knuckle;

wherein the at least one lid knuckle and the at least one base hinge knuckle are secured via a hinge pin allowing the lid to pivot about the long axis of the hinge pin.

10. The golf club of claim 8, wherein the at least one lid knuckle comprises includes upper and lower lid knuckle locking ridges for substantially maintaining the lid in a selected position.

11. The golf club of claim 10, wherein the base comprises a flexible base locking tongue for frictionally engaging the upper and lower lid knuckle locking ridges to bias the lid from pivoting from the selected position.

12. The golf club of claim 11, wherein the base locking tongue has an outside end, inside end, and an apex;

wherein when the lid is pivoted to the open position, the upper lid knuckle locking ridge frictionally engages the base locking tongue inside edge, applying a pivot resistive force upwards towards the upper lid knuckle locking ridge, biasing the lid from pivoting from the open position.

13. The golf club of claim 8, wherein the mounting anchor has the upper portion having an upper portion bore, the plurality of expandable legs, and the lower portion having a lower portion bore, the plurality of expandable legs being operably interposed between the mounting anchor upper and lower portions.

14. The golf club of claim 13, wherein threaded engagement of the lower portion causes the mounting anchor lower portion to contract the mounting anchor, causing the plurality of legs to outwardly expand, and the base lower surface to be compressed against the club grip top short end.

15. The golf club support of claim 8, further comprising a recessed ball marker storage region configured to receive a ball marker.

* * * * *